July 30, 1929.  W. I. WHEELER  1,722,546
POWER TRANSMISSION MECHANISM
Filed Jan. 15, 1925  4 Sheets-Sheet 1
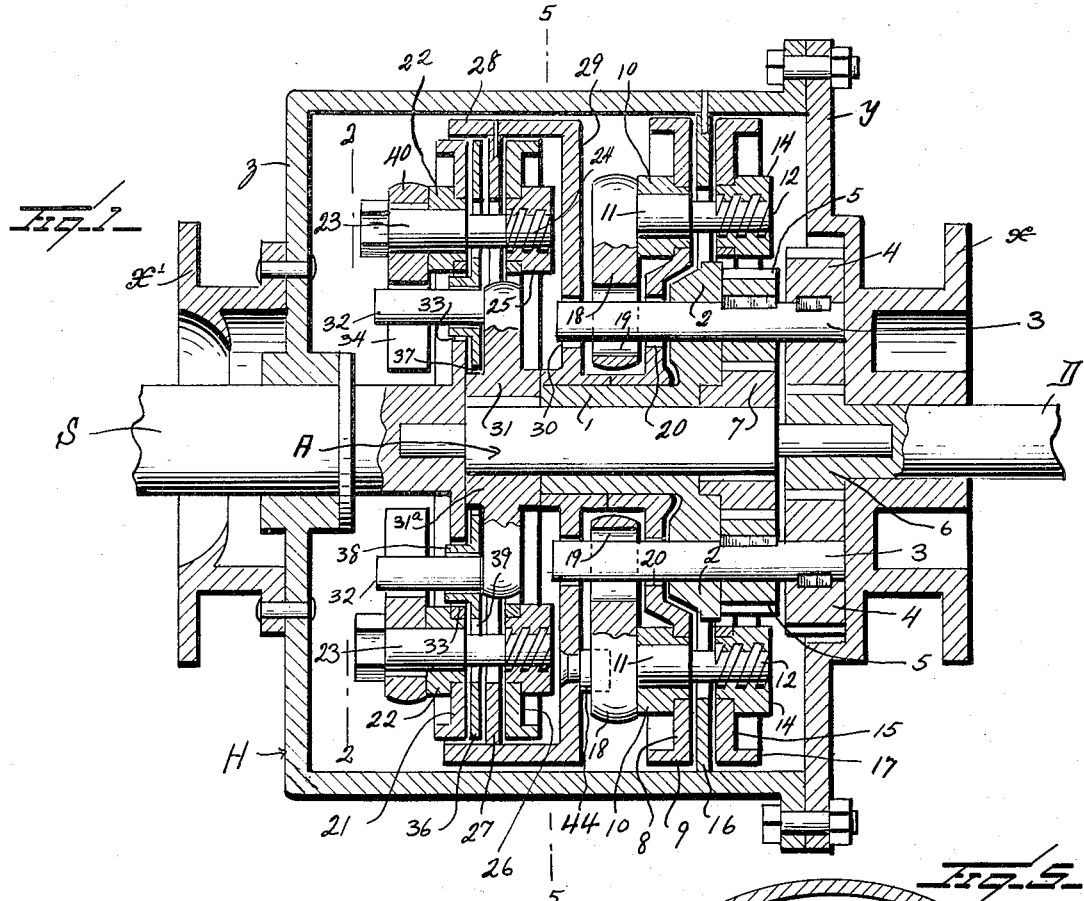
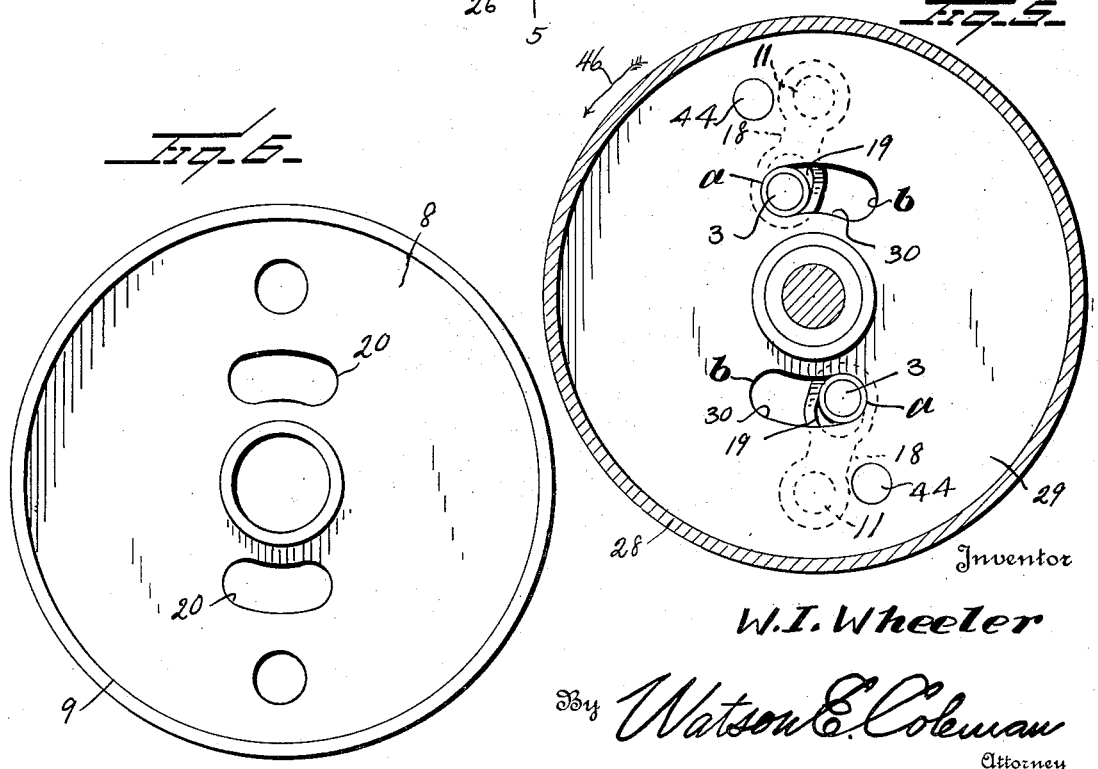
Inventor
W. I. Wheeler
By Watson E. Coleman
Attorney

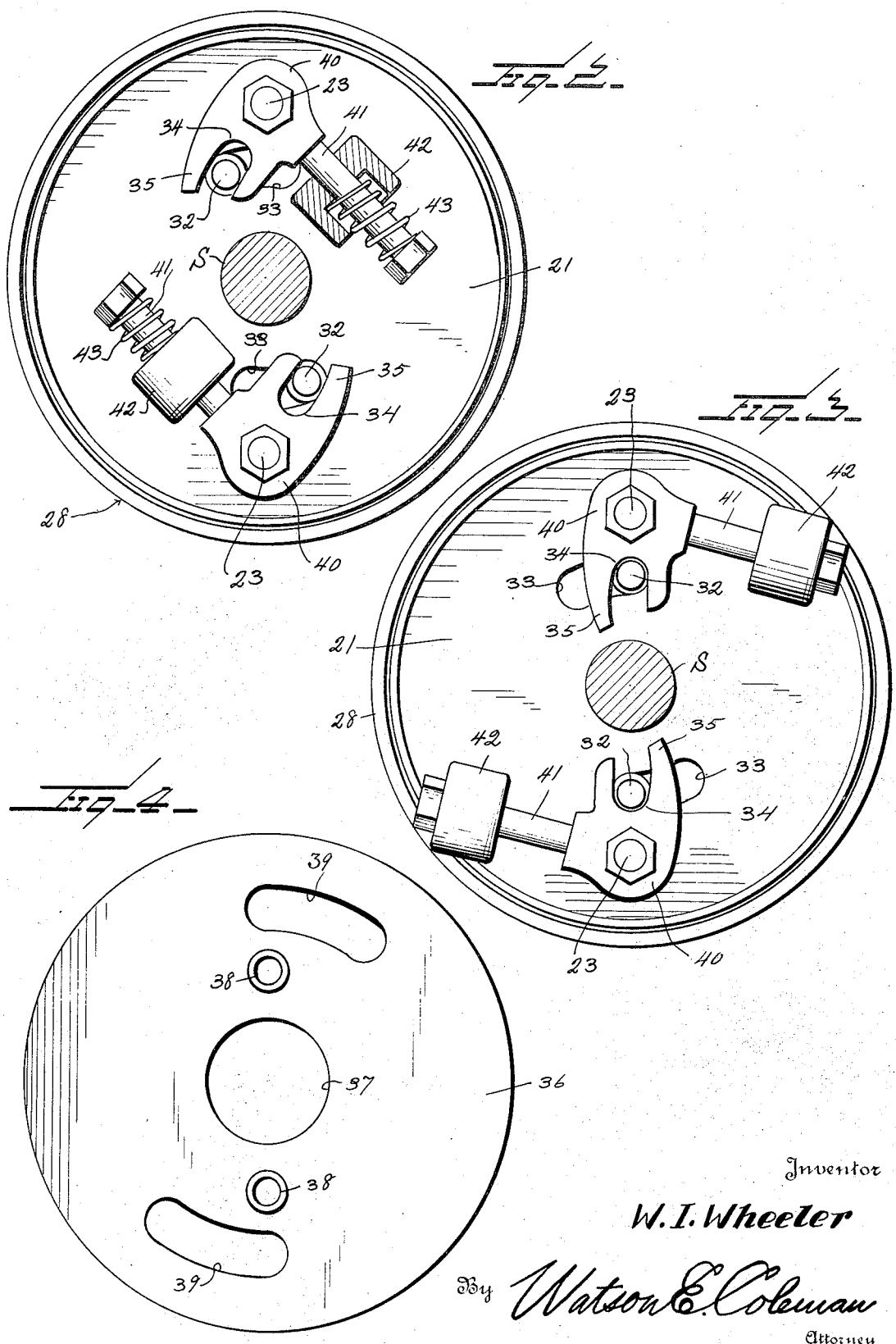

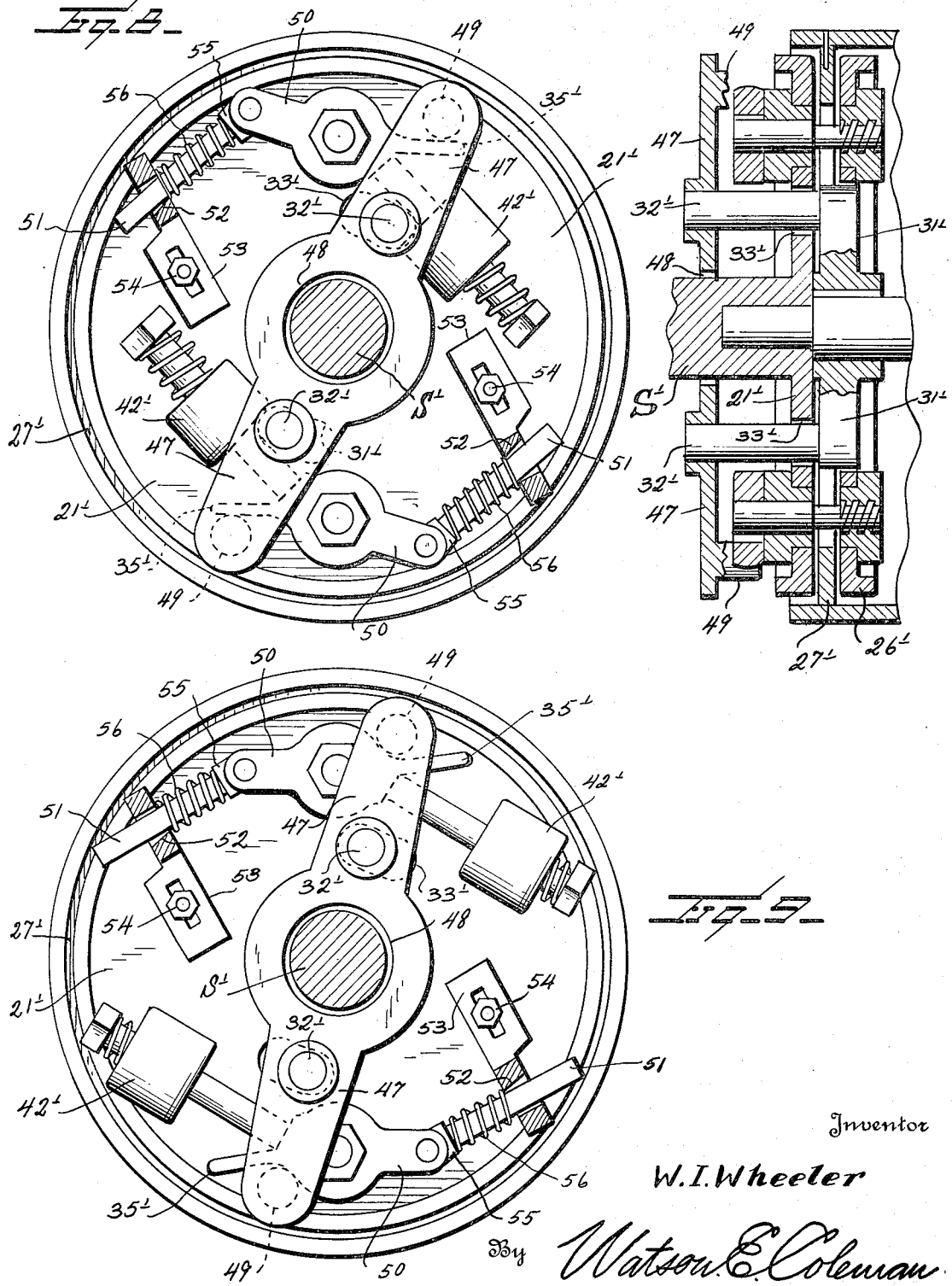

July 30, 1929.  W. I. WHEELER  1,722,546
POWER TRANSMISSION MECHANISM
Filed Jan. 15, 1925    4 Sheets-Sheet 4
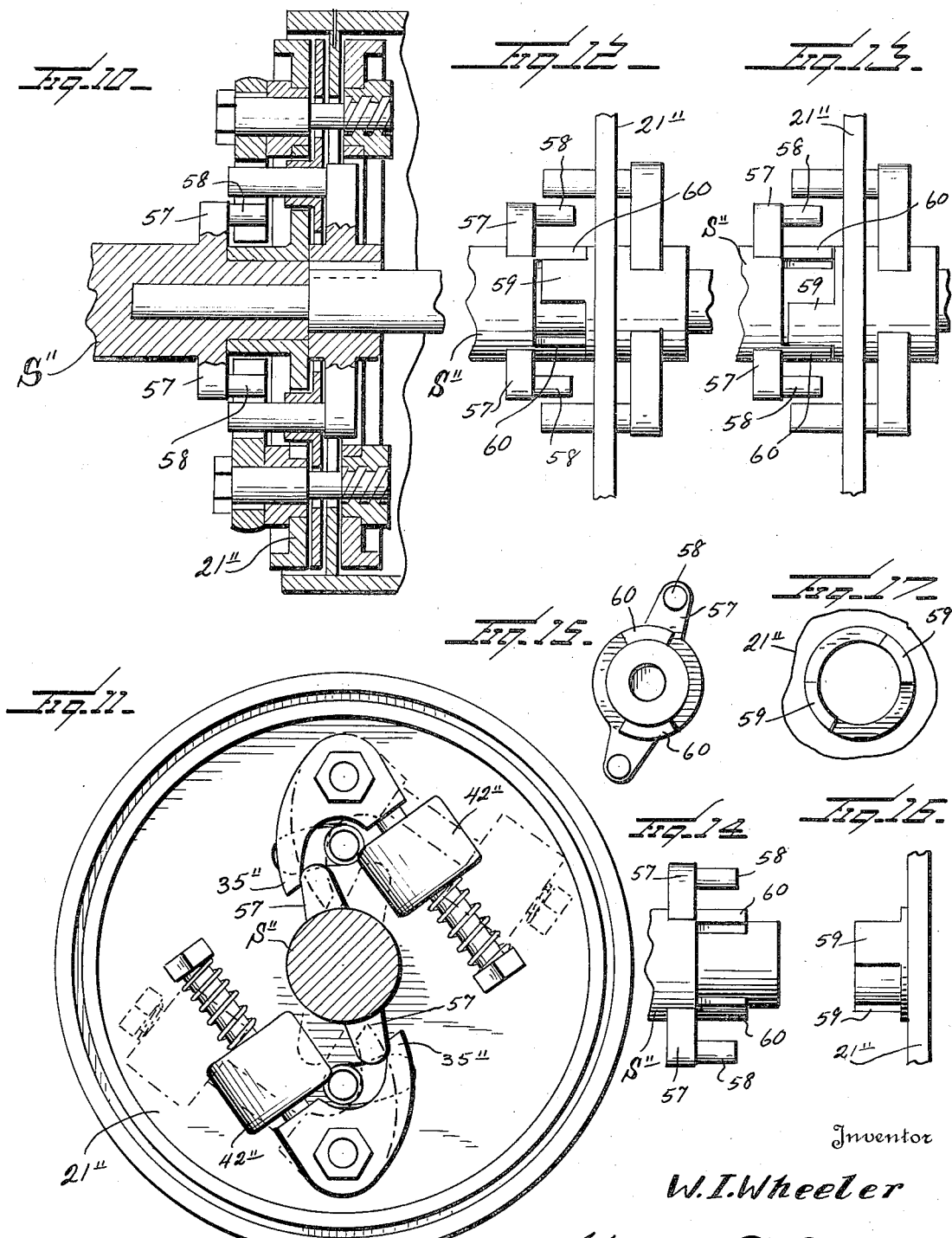

Patented July 30, 1929.

1,722,546

UNITED STATES PATENT OFFICE.

WILLIAM ISIAH WHEELER, OF SCOTTVILLE, ILLINOIS.

POWER-TRANSMISSION MECHANISM.

Application filed January 15, 1925. Serial No. 2,620.

This invention relates to certain improvements in power transmission mechanisms and it is an object of the invention to provide a device of this character wherein is embodied a plurality of relatively rotatable members provided with coacting clutching means which are brought into action under the influence of centrifugal force and wherein rotation of one of the members in one direction operates to release the clutching means to permit said rotatable members to rotate in the reverse direction.

Another object of the invention is to provide a novel and improved mechanism of this kind which may be effectively employed in connection with the motor to provide a braking medium particularly when descending a long hill or incline.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a power transmission mechanism constructed in accordance with an embodiment of my invention;

Figure 2 is a sectional view taken substantially on the line 2—2 of Figure 1;

Figure 3 is a view somewhat similar to Figure 2 but showing certain of the parts in a second position;

Figure 4 is a view in elevation of the oscillating disc as comprised in Figure 1;

Figure 5 is a sectional view on a reduced scale taken substantially on the line 5—5 of Figure 1 with the housing omitted;

Figure 6 is a view in elevation of a second disc as comprised in Figure 1;

Figure 7 is a fragmentary view partly in section and partly in side elevation illustrating another embodiment of my invention;

Figure 8 is a view partly in front elevation and partly in section of the structure as illustrated in Figure 7;

Figure 9 is a view similar to Figure 8 but showing certain of the parts in a second position;

Figure 10 is a view partly in section and partly in side elevation illustrating a still further embodiment of my invention;

Figure 11 is a view partly in section and partly in front elevation of the structure as illustrated in Figure 10;

Figure 12 is an enlarged fragmentary view in side elevation illustrating the relation of the hub of the disc and the associated shaft;

Figure 13 is a view somewhat similar to Figure 12 but showing said coacting hub in a second relative position;

Figure 14 is a fragmentary view in elevation of the driven shaft with certain of the parts carried thereby;

Figure 15 is a view in end elevation of the structure as illustrated in Figure 14;

Figure 16 is a fragmentary view in side elevation of the hub of the disc;

Figure 17 is a view in front elevation of Figure 16.

As disclosed in the accompanying drawings, H denotes a housing adapted to be connected in any desired manner with the casing of a prime transmission by the flange $x$ or otherwise as preferred, said flange $x$ being herein disclosed as carried by a removable head $y$ for the housing H, the opposite or permanent head $z$ being adapted to be suitably engaged with the supporting flange $x'$ or the like.

The drive shaft D of a prime transmission of any preferred type extends within the housing H through the head $y$ while extending within the housing through the opposite head $z$ is an end portion of a driven shaft S. Interposed between the inserted end portions of the shafts D and S and operatively supported thereby is a shaft section A.

As the construction and operation of the prime transmission forms no particular part of my present invention it is believed that the disclosure of the shaft D is sufficient to identify such prime transmission.

Loosely mounted on the central or intermediate portion of the shaft section A is a sleeve 1 provided at its extremity opposed to the drive shaft D with the diametrically opposed flanges or bosses 2 which rotatably support the shafts 3, said shafts 3 being in parallelism with the shaft section A, each of said shafts extending a desired distance beyond the opposite faces of its supporting boss or flange 2. The outer end portion of each of the shafts 3 has fixed thereto the gears 4 and 5 of different radii the outermost or larger gear 4 being in mesh with a gear 6 carried by the inserted end portion of the shaft D while the second gear 5 meshes with a gear 7 fixed to the shaft section A between the gear 6 and the sleeve 1, the gear 7 being preferably of a radius greater than that of the gear 6.

Freely mounted on the sleeve 1 inwardly of and immediately adjacent to the bosses or flanges 2 is a disc 8 the peripheral portion of which is defined by a strengthening flange 9 closely approaching the peripheral wall of the housing H. Disposed through the disc 8 at diametrically opposed points are the plugs or bushings 10 through each of which is directed a shank or bolt 11 provided at its inner portion with the left hand threads 12 said threaded portion being directed through a plug or bushing 14 operatively engaged with an annular member 15 concentric to the shaft section A.

Interposed between the peripheral portion of the disc 8 and the annular member 15 is an annular member 16 bolted or otherwise fixedly secured to the peripheral wall of the housing H. The outer or peripheral portion of the annular member 15 is also provided with an outstanding reinforcing flange 17.

Each of the shanks 11 outwardly of the bushing 10 is provided with an inwardly extended rock arm 18 provided with a longitudinally disposed slot 19 through which extends the inner end portion of the adjacent shaft 3 said end portion of the shaft being also disposed through an arcuate slot 20 suitably produced in the disc 8. The slots 20 permit the disc 8 to have limited rocking or oscillating motion independently of the shafts 3 for a purpose which will be more fully set forth. The inserted end portion of the shaft S is defined by an outstanding circular flange of requisite diameter constituting a disc 21 having disposed therethrough at diametrically opposed points the bushings 22 through each of which is directed a shank 23. The inner portion of the shank 23 is provided with the left hand threads 24 engageable within a bushing 25 carried by an annular member 26 concentric to the shaft section A.

Interposed between the peripheral portion of the disc 21 and the annular member 26 is an annular member 27 carried by and extending inwardly from an outwardly disposed flange 28 defining the peripheral portion of the plate or disc 29. This plate or disc 29 is freely mounted on the end portion of the sleeve 1 at the side of the disc 8 remote from the bosses or flanges 2. This plate 29 is provided with the arcuate slots 30 through which are directed the inner portions of the shafts 3.

Keyed to the shaft section A and interposed between the sleeve 1 and the inserted end of the shaft S is a member 31 provided at diametrically opposed points with the outwardly disposed shafts 32 which are directed through the arcuate slots 33 produced in the disc 21 and also through the open slots 34 produced in the arms or bills 35 fixed to the outer portions of the shanks 23.

Interposed between the disc 21 and the members 27 and 31 is a disc 36 provided with a central opening 37 surrounding the outer end portion of the hub 31$^a$ of the member 31 and which is provided with the openings or bosses 38 through which are directed the shafts 32 whereby the disc 36 is subject to move in either direction as occasioned or effected by the member 31. This disc 36 is also provided with the arcuate slots 39 through which the shanks 23 are directed whereby the disc 36 is capable of oscillation or movement in either direction independently of the sleeve 1 and the flanges or bosses 2 carried thereby.

Each of the arms or bills 35 is carried by a head 40 which is provided with an elongated rod 41 on which is slidably mounted a weighted member 42. Associated with the member 42 is an expansible member 43 for automatically urging the member 42 inwardly of the rod 41.

In operation, the shaft D being rotated clockwise, the gear 7 is rotated in the same direction at a reduction determined by the size of the various gears 4, 5 and 6 at whatever ratio desired and the gears 4 and 5 are held against reverse rotation by the braking acting of the disc 8 and the members 15 and 16. When the gears 4 and 5 rotate in reverse direction a slight distance the arms 18 are rocked by the shafts 3 resulting in the disc 8 and the members 15 and 16 being brought into frictional contact. As the gear 7 and the member 31 are keyed to the shaft section A the member 31 is driven at whatever reduction occasioned by the gears and in the same direction as the shaft D. The shafts 32 having limited movement in the arcuate slots 33 and direct contact with the bills or arms 35 will move or rock the shanks 23 in a direction to separate the discs 21 and 36 and the members 26 and 27. The arcuate slots 39 in the disc 36 will permit the disc 36 to have an equal movement without interference by the shanks 23.

In this adjustment the mechanism will be driving in low or reduced speed. With sufficient speed of the shaft S the resultant centrifugal force will cause the weighted members 42 to reach their outward movement and thus carry the shafts 32 and the disc 36 to the opposite ends of the arcuate slots 33 and which increased speed may be effected by accelerating the motor and releasing the same or otherwise as preferred. When the members 42 have reached an outward position the shanks 23 have been rotated sufficiently to bring the discs 21 and 36 and the members 26 and 27 into frictional contact whereby the member 31 and its shafts 32 are held against movement or slippage independent of the disc elements and associated members and thereby prevent the members 42 operating to release the clutching action without first moving or slipping the disc 36. It will, therefore, be seen that the arms or bills 35 are relieved of considerable pressure by contact of the shafts 32 by reason of the fact that the disc 36, which is mounted on and supported by said shafts 32, is frictionally held between the disc 21 and the annular member 27. At this time it is to be understood that when the weighted members 42 are in their outward or active position it is desirable that the disc 8 and the annular members 15 and 16 be inactive and thus allow the gears 4 and 5 and their correlative parts to turn in a clockwise direction and in unison with the shaft S.

The slight rotation of the gears 4 and 5 hereinbefore referred to is caused by the natural mechanical law of torque and if no means were provided to prevent the gears 4 and 5 from rotating they would continue to rotate indefinitely around the gear 7 without effect upon such gear 7. However, in order to effect the desired operation of the shaft S, it is necessary, as is believed to be obvious, that the gear 7 must rotate. The disc 8 and annular member 15 which are loosely supported with respect to the sleeve 1 are limited in their reverse rotation for a slight distance because the torque required to rotate the gear 7 and all its correlative parts in a clockwise direction will cause said gears 4 and 5 to have a tendency to rotate in a reverse direction with sufficient torque. Therefore, the gears 4 and 5 which are carried by the flanges or bosses 2 of the sleeve 1 in their anti-clockwise rotation will carry the sleeve 1 in a reverse direction, the shafts 3 traveling from the end $a$ of the slots 20 and 30 toward the end $b$ of such slots. This action also carries the arms 18 in the same direction, resulting in rocking of the shafts 11 and causing the disc 8 and member 15 to have braking action upon the member 16. When this braking action is effected further reverse rotation is arrested of the gears 4 and 5 and their correlative parts. It is, therefore, to be understood that the slots 20 and 30 together with the slots 19 of the rock arms 18 should be of sufficient length to permit the arms 18 and the shafts 11 to operate the distance required to bring the disc 8 and member 15 into braking engagement with the member 16 when necessary to hold the gears 4 and 5 against reverse rotation when driving the gear 7 in a clockwise direction or to disengage the disc 8 and member 15 from the member 16 when the gears 4, 5 and 7 rotate as a unit.

As illustrated in Figure 2, the shafts 32 are in position when the shafts 3 by reason of reverse torque are at or near the ends $b$ of the slots 20 and 30 or when the disc 8 and member 15 are in braking engagement with the member 16. It is thus obvious that the gear 7 and all its correlative parts will be rotated clockwise or in the same direction as the gear 6 carried by the driving shaft D and the torque load delivered to the shafts 32 and the shaft S. When driving at a reduction with the parts as illustrated in Figure 2, the discs 21 and 36 together with the member 26 are in release with respect to the member 27, the coaction of the arms or bills 35 with the shafts 32 effectively maintaining such release. This is maintained, with a sufficient motor speed, when a heavy torque load is being borne and which is of importance because a partial engagement of the braking elements would present a dragging or braking effect, thus causing a loss of power.

It is believed to be obvious that the torque that holds the clutching elements 21, 26, 27 and 36 in release relation must be overcome to permit the members 42 to take the position illustrated in Figure 3. This torque is overcome either by a continuous increase of speed in which event there is a proportional increase of centrifugal force to cause the members 42 to increase in leverage and power, thus carrying the shafts 32 from their position illustrated in Figure 2 toward the opposite ends of the slots 33 as illustrated in Figure 3. This action, however, may be accomplished by accelerating the motor a sufficient amount to acquire such drifting momentum of the vehicle to enable the vehicle to coast and at which time, if the acceleration is released, the torque is also released, thus allowing the members 42 to take the position illustrated in Figure 3. When the members 42, or more particularly the shafts 32, are in the position illustrated in Figure 3, the clutching elements 21, 26, 27 and 36 will be in action. The slots 39 through which pass the shafts 23 are provided to permit the desired movement of the disc 36. In this condition the gears 4, 5 and 7 will rotate as a unit in a clockwise direction and the shafts 3 will pass from the ends b of the slots 20 and 30 to the ends a thereof, thus disengaging the clutching or braking elements 8 and 15 from the member 16. Under this condition the shaft S will be driven in a direct or high speed.

With the discs 21 and 36 and the members 26 and 27 frictionally engaged, the plate 29 is rotated with the disc 21 independently of the shafts 3 and their associated parts for a distance limited by the arcuate slots 30. At this time the rock arms 18 will be swung a distance sufficient to effect a release or separation of the braking medium as comprised in the disc 8 and the coacting members 15 and 16. When the shafts 3 are positioned at the ends b of the slots 20 in the disc 8 requisite swinging movement of the arms 18 will be permitted. When the mechanism is being driven in a forward direction at high speed the shafts 3 will naturally take a position at the ends a of the slots 30 of the plate 29. However, when the prime shaft D is shoved into reverse the shafts 3, through the reduced gear condition before the reverse drive is instituted will assume positions at the opposite ends b of the slots 30 at which time the outstanding bosses 44 diametrically arranged on the plate 29 will come into contact with the outer portions of the arms 18 and with the shafts 3 located by the b ends of the slots 30 the elements 21, 26, 27 and 36 are in release with the elements 8, 15 and 16 in braking contact and hence the mechanism will be driven as a unit in a reverse direction and at the same speed and in unison with the driving shaft D. In view of this it will be obvious that my improved mechanism, as herein disclosed eliminates the necessity of reversing gears when used in connection with the prime mover in which requisite reversing gears are associated. Upon anti-clockwise rotation of the shaft D and gear 6, the gears 4 and 5 will have a tendency to rotate clockwise or in the opposite direction which would be the direction to disengage the disc 8 and member 15 from the member 16 and the torque delivered through the shafts 32 toward the end of the slots 33 as in Figure 3 results in the clutching action of the elements 21, 26 and 36, thus carrying the plate 29 with respect to the shafts 3 from the ends b of the slots 30 to the ends a and in which position it will be noted the bosses 44 will engage the members 18 which are in release or unlocking position, preventing the disc 8 and member 15 from rotating from release to set position or, in other words, the bosses 44 lock the disc 8 and the member 15 in unlocked positions and thus enabling the unit to turn in an anti-clockwise direction.

With the shaft D rotating in reverse, the gears 4 and 5 will swing the arms 18 in a direction to cause braking action of the members 8, 15 and 16, but the bosses 44 will engage the arms 18 at substantially the same time the shafts 3 arrive at the a ends of the slots 30 upon the anti-clockwise rotation of the shaft D. This will prevent any further relative movement between the plate 29 and shaft and thus the braking element 8, 15 and 16 will remain disengaged and all of the rotatable parts will rotate as a unit in an anti-clockwise direction.

When the shafts 3 are at the b ends of the slots 30, the disc 8 and the members 15 and 16 will be disengaged or in release and as is believed to be obvious the disc 36 and members 26 and 27 will be in frictional engagement or clutching action resulting in the locking of the plate 29 in harmony with the clutching elements, 21, 26, 27 and 36. The plate 29 will then be carried in an anti-clockwise direction and this will tend to swing the arms 18 in a direction to cause a braking action of the members 8, 15, and 16. However, upon such anti-clockwise movement of the plate 29, the bosses 44 engage the arms 18 and prevent such movement and the gears 4 and 5 will be held against reverse rotation, thus causing the shaft S to rotate in a reverse or anti-clockwise direction.

The shanks 23 operate to move the disc 21 and the member 26 toward each other and engage therebetween the disc 36 and the member 27 when the weighted members 42 are at their outward position as seen in Figure 3, resulting in the disc 36 being securely held between the disc 21 and member 27. Before the members 42 can be retracted from their outward position, the disc 36 must be moved or slipped to release the centrifugal clutching action and this is accomplished automatically when centrifugal force has decreased and torque increased to a point where it is necessary to change from a direct drive to a gear reduction drive.

The shafts 3 are carried by the flanges or bosses 2 of the sleeve 1 and, therefore, upon reverse rotation of the gears 4 and 5, as would be the tendency at any time when the device is being driven in gear reduction, the shafts 3 and their correlative parts cannot rotate reverse to gears 6 and 7 more than a distance equal to the length of the slots 30. As the plate or disc 29 floats on the sleeve 1 the rotation of the gears controls the movement of the shafts 3. The gears 4 and 5 tend to rotate anti-clockwise when the gear 6 is rotating clockwise only when driving or pulling in gear reduction which causes the gears 4 and 5 to have a tendency to rotate counter-clockwise. This movement carries the shafts 3 counter-clockwise which also causes the arms 18 to rock anti-clockwise, thus bringing the shafts 3 to the ends b of the slots 30. This rocking movement of the arms 18 causes the member 15 and plate or disc 29 to engage the annular member 16 holding the shafts 3, sleeve 1 and gears 4 and 5 against further reverse rotation with the shafts 3 toward the ends *b* of the slots 30. When the centrifugal action causes the direct drive element to engage the sleeve 1 the shafts 3 and gears 4 and 5 are locked for unitary clockwise rotation with the gear 6 which, of course, prevents the shafts 3 traveling to the ends *a* of the slots, thus releasing the plate 29 and member 15 with respect to the annular member 16. The plate or disc 29 together with the annular member 15 float on the sleeve and for this reason the plate 29 is provided with the slots 30 to permit the shafts 3 to properly engage within the slots 19 of the arms 18, whereby any movement of the shafts 3 either clockwise or counter-clockwise carries with them the arms 18 of the shafts 11 to either engage or release the member 15 and plate 29 from the member 16.

I also find it of advantage to provide the structure as particularly illustrated in Figures 7, 8 and 9 when it is desired to use the motor as a brake and particularly when descending a hill or incline. As disclosed in these figures a radially disposed elongated arm 47 is supported outwardly of the arms or bills 35' and supported upon the end portions of the shafts 32'. The central portion of the arm 47 is provided with an opening 48 through which the shaft S' is freely disposed. The opposite end portions of this arm 47 are provided with the inwardly directed pins or shafts 49 arranged outwardly of the arms or bills 35' and in contact therewith. The shafts 32' are disposed through the arcuate slots 33' of the disc 21' carried by the inserted end portion of the shaft S'. This disc 21' together with the annular member 26' coacts with the annular member 27' in the same manner as herein set forth with respect to the corresponding elements 21, 26 and 27 hereinbefore referred to. When the drive shaft is normally rotating in a forward direction at a gear reduction drive the shafts 32' will assume a position as illustrated in Figure 9 and in no way interfere with the free movement of the weighted members 42' associated with the arms or bills 35'. It will be understood, however, that as the member 31' and its correlated parts be rotated by the power of the car, as in descending an incline or hill, the disc 21' will have pressure in the direction opposite to that when the motor is pulling the car. This will result in the arm 47, and pins or shafts 49 swinging in a direction resulting in the pins or shafts operating upon the bills 35' to effect a release or disengagement of the clutching elements 21' 26' and 27'. It is to be understood that this effect may be had when the car is descending an incline and the motor is being used as a braking medium and in which instance the torques will be the reverse of that when the motor is pulling the car.

Each of the arms or bills 35' is provided with the rearwardly directed tail piece 50 with which is pivotally engaged an end portion of a rod 51, the opposite or free extremity of which being slidably disposed through an opening 52 in the plate 53. This plate 53 is adjustably connected, as at 54, with the disc 21'. The pivoted end portion of the rod 51 is provided with the head or shoulder 55 and interposed between said head or shoulder 55 and the plate 53 is an expansible member 56, herein disclosed as a coil spring encircling said rod.

When the members 42' are in their outermost positions the members or springs 56 are compressed with a resultant tendency to force said members 42' to their inner positions. However, these members or springs 56 when under compression do not have as much power to force the members 42' to their inner positions as they do to maintain said members 42' in such inner positions. This is due to the fact that the leverage at the point where each of the springs exerts its force is much shorter when the member 42' is in its outward position than when said member 42' is in its inner position. These members or springs 56, however, do not hinder the required speed of the shaft S' to cause the outward movement of the members 42' whereby the clutching members 21', 26' and 27' are prevented from being partially engaged in climbing a hill and at which time considerable engine speed is required. It will therefore be readily understood that loss of energy and the production of undue heat and wear is avoided.

The members or springs 56 when properly adjusted will hold the members 42' in their inner positions and thus allow the required motor speed for pulling hills etc. The tension of the members or springs 56 is also such as not to offer sufficient force to return said weighted members 42' to their inner positions until speed and torque demand it. In other words when starting a vehicle equipped with the device and starting say in low, the members 42' will be in their inner positions. Upon accelerating the motor centrifugal force will induce the members 42' to overcome the resistance offered by the members or springs 56 and to assume their outer positions.

While the accompanying drawings show the members or springs 56 exerting their force in a direction substantially tangential to the axes of the arms or bills 35', the plates 53 may be adjusted to assure a more direct straight line of pressure.

In the embodiment of my invention as illustrated in Figures 10 to 17, the shaft S″ has the disc 21″ rotatably mounted thereon, said disc 21″ having a limited oscillating movement independently of the shaft. The shaft S″ is provided with two opposed outstanding webs or arms 57, each of which being provided with an inwardly disposed shaft 58.

The hub portion of the disc 21″ is provided with the extended and circumferentially spaced members 59 which extend between the spaced lugs 60 carried by the shaft S″. The space between adjacent lugs 60 determines the extent of independent oscillatory movement of the disc 21″ independently of the shaft S″.

Figure 11 illustrates the inner positions of the members 42″ which may be effected in starting a car from a standstill and going forward and may be effected when ascending a hill or on an incline during which time the shaft S″ and the shafts 58 will be in the position illustrated by dotted lines in Figure 11 while the spaced members 59 and lugs 60 will be in the relative arrangement as shown in Figure 12.

If the motor is to be used as a braking feature when descending a hill or incline the torque is reversed or disposed in the direction opposite to that when the motor is pulling the car, consequently, the shaft S″ will rotate from the positions shown by dotted lines in Figure 11 to the positions illustrated by full lines in said figure and the shafts 58 will contact with the lower extremities of the arms or bills 35″ causing the weighted members 42″ to be moved to their inner positions and thereby releasing the clutching elements.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice as hereinafter claimed.

I claim:—

1. In combination with two members, one of said members being capable of rotation independently of the other, a shank rotatably supported by one of the members, centrifugally operated means for rocking the shank, a clutching element carried by the shank and coacting with the second member upon rotation of the shank under the action of the centrifugal means for locking the members one to the other, a disc supported for limited oscillation independently of the members and comprised in the clutch mechanism, and supporting means for the disc having movement in a direction to release the clutching means.

2. In combination with two members, one of said members being capable of rotation independently of the other, a shank rotatably supported by one of the members, centrifugally operated means for rocking the shank, a clutching element carried by the shank and coacting with the second member upon rotation of the shank under the action of the centrifugal means for locking the members one to the other, a disc supported for limited oscillation independently of the members and comprised in the clutch mechanism, and supporting means for the disc having movement in a direction to release the clutching means, said disc having an arcuate slot through which the shank is disposed.

3. In combination with two relatively rotatable members, coacting clutching means carried thereby, means operable under influence of centrifugal force for bringing into action said coacting clutching means, yieldable means initially offering resistance to the action of the centrifugal means, means for retracting the centrifugal means from their outward or engaged position and rendering said coacting clutching means inactive or disengaged, means for tripping the centrifugal coacting clutching means, said means for tripping the centrifugal coacting clutching means operating to engage or contact said centrifugal means at any desired point.

In testimony whereof I hereunto affix my signature.

WILLIAM I. WHEELER.